United States Patent
Yang et al.

(10) Patent No.: US 11,320,365 B2
(45) Date of Patent: May 3, 2022

(54) DETERMINATION METHOD FOR LIP STICKING FORCE OF CIGARETTE TIPPING PAPER

(71) Applicant: CHINA TOBACCO YUNNAN INDUSTRIAL CO., LTD, Kunming (CN)

(72) Inventors: Ji Yang, Kunming (CN); Zhihua Liu, Kunming (CN); Chunbo Liu, Kunming (CN); Ruizhi Zhu, Kunming (CN); Xiaoxi Si, Kunming (CN); Shiyun Tang, Kunming (CN); Fengmei Zhang, Kunming (CN); Wei Jiang, Kunming (CN); Zhenjie Li, Kunming (CN)

(73) Assignee: CHINA TOBACCO YUNNAN INDUSTRIAL CO., LTD, Kunming (CN)

( * ) Notice: Subject to any disclaimer, the term of this patent is extended or adjusted under 35 U.S.C. 154(b) by 0 days.

(21) Appl. No.: 17/293,924

(22) PCT Filed: Dec. 30, 2020

(86) PCT No.: PCT/CN2020/141590
§ 371 (c)(1),
(2) Date: May 14, 2021

(87) PCT Pub. No.: WO2021/136421
PCT Pub. Date: Jul. 8, 2021

(65) Prior Publication Data
US 2022/0050047 A1    Feb. 17, 2022

(30) Foreign Application Priority Data
Jun. 22, 2020    (CN) .......................... 202010576787.1

(51) Int. Cl.
*G01N 19/04*    (2006.01)
*A24D 3/18*    (2006.01)

(52) U.S. Cl.
CPC ............... *G01N 19/04* (2013.01); *A24D 3/18* (2013.01)

(58) Field of Classification Search
CPC ........... G01N 19/04; G01N 10/04; A24D 3/18
(Continued)

(56) References Cited

FOREIGN PATENT DOCUMENTS

| CN | 111721702 | * | 9/2020 |
| CN | 111723489 | * | 9/2020 |

* cited by examiner

*Primary Examiner* — Robert R Raevis
(74) *Attorney, Agent, or Firm* — Bayramoglu Law Offices LLC

(57) ABSTRACT

A determination method for lip sticking force of cigarette tipping paper is provided. The artificial saliva is used to clamp the tipping paper and the artificial mouth skin that are bonded between two jigs, respectively. The two jigs move relative to each other. Force changes during the test are collected through a force sensor and a displacement sensor. The maximum debonding force obtained by the test is divided by the sticking area of the tipping paper and the artificial mouth skin to obtain the lip sticking force of the cigarette tipping paper per unit area. The present invention can accurately quantify the sticking force of the cigarette tipping paper to lips, can well avoid subjective factor influence and difference characterization brought by traditional personal sensory smoking evaluation, is more objective, efficient, has good repeatability, high sensitivity and simple operation.

10 Claims, 2 Drawing Sheets

(58) Field of Classification Search
USPC ......... 73/150 A, 7, 841, 842, 845, 846, 159,
73/865.8, 865.9, 866
See application file for complete search history.

DETERMINATION METHOD FOR LIP STICKING FORCE OF CIGARETTE TIPPING PAPER

CROSS REFERENCE TO THE RELATED APPLICATIONS

This application is the national stage entry of International Application No. PCT/CN2020/141590, filed on Dec. 30, 2020, which is based upon and claims priority to Chinese Patent Application No. 202010576787.1 filed on Jun. 22, 2020, the entire contents of which are incorporated herein by reference.

TECHNICAL FIELD

The present invention belongs to the technical field of analysis and detection, and in particular, relates to a determination method for lip sticking force of cigarette tipping paper.

BACKGROUND

At present, a cigarette filter is mainly composed of cellulose acetate, plug wrap paper and tipping paper. Imitation cork paper, also known as tipping paper, is used to wrap the outside of the filter tip and stick the filter tip to the end of the cigarette rod. The imitation cork paper is a kind of decorative paper obtained by printing, coating and processing the base paper. The tipping paper typically has a cork-like or opaque white appearance, and has an ornamental function.

The tipping paper is in direct contact with the smoker's lips, and generally, the tipper paper is printed only with paint or ink. In dry weather, when a person smokes a cigarette, a small amount of saliva may wet the tipping paper, and then the tipping paper dries slowly in the process of smoking, such that salivary protein remaining on the lips will have a bonding effect on the tipping paper, causing the tipping paper on the filter tip to stick to the skin of the lips. Consequently, the lip is likely to bleed due to tearing. After smoking, the filter tip cannot be spit out smoothly, which seriously affects the experience of the smoker.

At present, there is no relevant research on the lip sticking force or lip sticking degree of cigarette filter tipping paper. Additionally, there is no corresponding standard in the industry. The related literature at home and abroad mainly concern how to improve and optimize the composition and process of the tipping paper, and do not involve the establishment of specific detection methods. For example, the invention patent, titled Scented health-care tipping paper capable of avoiding sticking to lips and preventing lips and tongue from drying and preparation method thereof, discloses the technological formula of tipping paper, but only the longitudinal tensile strength and the air permeability of the base paper are detected during the effect detection, and the lip sticking force detection is not disclosed.

The invention patent, titled Anti-pollution filter tip of anti-sticking lip, discloses coating a protective film on the outside of the imitation cork paper, but does not propose a specific detection method for preventing lip sticking.

The invention patent, titled Multi-functional Imitation Cork Paper, aims to prevent lip sticking, adds fragrance, and lowers ignitability and adds other features. The outer layer of the imitation cork paper is compounded with a fruity waterproof layer and a protective film layer, but no test result of preventing lip sticking is described.

The cigarette manufacturers evaluate and judge the sticking effect by personally sampling the cigarette, which is especially subjective and uncertain. In order to accurately measure the stickiness/sticking force of different processes and different types of tipping paper on lips, it is desirable to establish a corresponding objective analysis and testing method, to provide the basis for cigarette material selection and quality evaluation.

SUMMARY

The present invention solves the shortcomings of the prior art. A determination method for lip sticking force of cigarette tipping paper is provided. The method can accurately quantify the sticking force of cigarette tipping paper to lips, avoids the influence of subjective factors and different characterizations that result from personal smoking evaluation, is more objective, efficient, has good repeatability, high sensitivity and simple operation, and has advantages in material selection, quality control and product upgrading in the tobacco industry.

To achieve the above purpose, the technical solution adopted by the present invention is as follows:

A determination method for lip sticking force of cigarette tipping paper includes the following steps:

step (1), cutting the cigarette tipping paper into a rectangle;

step (2), making artificial saliva with a pH value of 5.5 to 7.5;

step (3), cutting an artificial mouth skin into a rectangle with the same size as the cigarette tipping paper;

step (4), sticking the artificial mouth skin cut in step (3) and one side of the cigarette tipping paper cut in step (1) relatively through the artificial saliva, determining a sticking area, and after staying aside until constant weight, obtaining a sample to be tested, when sticking, a printing surface of the cigarette tipping paper facing the artificial mouth skin;

step (5), clamping the other side of the tipping paper of the sample to be tested obtained in step (4) and the other side of the artificial mouth skin that are not bonded together on two jigs, respectively, setting a distance and a relative movement rate between the two jigs, and collecting a maximum debonding force at the moment of separation of the tipping paper from the artificial lip; and step (6), dividing the maximum debonding force obtained in step (5) by the sticking area of the tipping paper and the artificial mouth skin to obtain the lip sticking force of the cigarette tipping paper per unit area, wherein a material of the artificial mouth skin is medical silicone rubber soft skin, active composite skin with an epidermal cell layer, polyvinyl chloride artificial leather, polyurethane dry artificial leather or polyolefin artificial leather.

The purpose of "staying aside until the constant weight" in the present invention is to allow the artificial saliva to fully bond the artificial mouth skin cut in step (3) and the cigarette tipping paper cut in step (1), and the step of staying aside allows the sticking agent (the artificial saliva) to be completely dried.

Further, it is preferable that in step (1), a cutting the cigarette tipping paper is cut in a width range of 1 mm to 1000 mm and a length range of 1 mm to 1000 mm. The length of the cigarette tipping paper and the artificial mouth skin needs to be such that the present invention can be realized and the cigarette tipping paper and the artificial mouth skin can be clamped between two jigs.

Further, it is preferable that in step (2), the artificial saliva includes sodium chloride, potassium chloride, calcium chloride, sodium dihydrogen phosphate, magnesium chloride, urea, glucose, mucin, amylase, acid phosphatase and lysozyme.

Further, it is preferable that the artificial saliva contains 1.40 mmol/L sodium chloride, 0.5 mmol/L potassium chloride, 0.1 mmol/L calcium chloride, 0.15 mmol/L sodium dihydrogen phosphate, 0.025 mmol/L magnesium chloride, 0.09 mmol/L urea, 0.2 mmol/L glucose, 2.7 mmol/L mucin, 2.5 units/mL amylase, 0.004 units/mL acid phosphatase, and 0.7 units/mL lysozyme.

Further, it is preferable that a volume range of the artificial saliva used for sticking is 1 μL to 1000 μL. The artificial saliva is pipetted onto the artificial mouth skin using a micro-syringe, a pipette gun or a pipette, and then the printing surface of the cigarette tipping paper sticks to the artificial mouth skin.

The present invention does not limit the amount of artificial saliva per unit area, as long as it can be bonded.

Further, it is preferable that the time of staying aside in step (4) is 1 s to 300 s.

Further, it is preferable that in step (5), the two jigs can completely clamp the other side of the cigarette tipping paper and the other side of the artificial mouth skin; and the two jigs can move relative to each other.

Further, it is preferable that in step (5), the maximum debonding force is determined by using any one of a debonding strength tester, a tensile tester, and a dynamic friction coefficient determinator.

Further, it is preferable that the tester has a load range of 0 N to 200 N and a resolution of greater than and equal to 0.01 N.

Further, it is preferable that in step (5), the distance between the two jigs is 5 mm to 500 mm, and the movement rate is 1 mm/min to 500 mm/min.

The devices used for testing in the present invention are all existing devices, and the present invention does not improve the specific structure of the devices.

Compared with the prior art, the present invention has the following advantages:

The present invention provides a determination method for the lip sticking force of the cigarette tipping paper, which can objectively and accurately quantify the lip sticking force of the tipping paper, can effectively avoid the traditional unquantifiable concepts such as lip sticking discomfort and dry mouth feeling obtained by sensory evaluation, and avoid the disadvantages of strong subjective factors, great differences in product assessment results, harmful to human health and the like. In the method, the artificial saliva is used to effectively bond the tipping paper and the artificial mouth skin. After staying aside for a period of time, the bonded tipping paper and the artificial mouth skin are clamped between two jigs, respectively. The two jigs move relative to each other, and the values of force changes during the test are collected through a force sensor and a displacement sensor. The tested maximum debonding force is divided by the sticking area of the tipping paper and the artificial mouth skin to obtain the lip sticking force of the cigarette tipping paper per unit area. The present invention is objective, efficient, has good repeatability and is simple to operate, and has advantages in material selection, quality control and product upgrading in the tobacco industry. The ethical and moral constraints of population experiments are avoided, while the cost of experiments is saved and the risk to human health due to personally smoking is reduced.

DETAILED DESCRIPTION OF THE EMBODIMENTS

Figure 1:
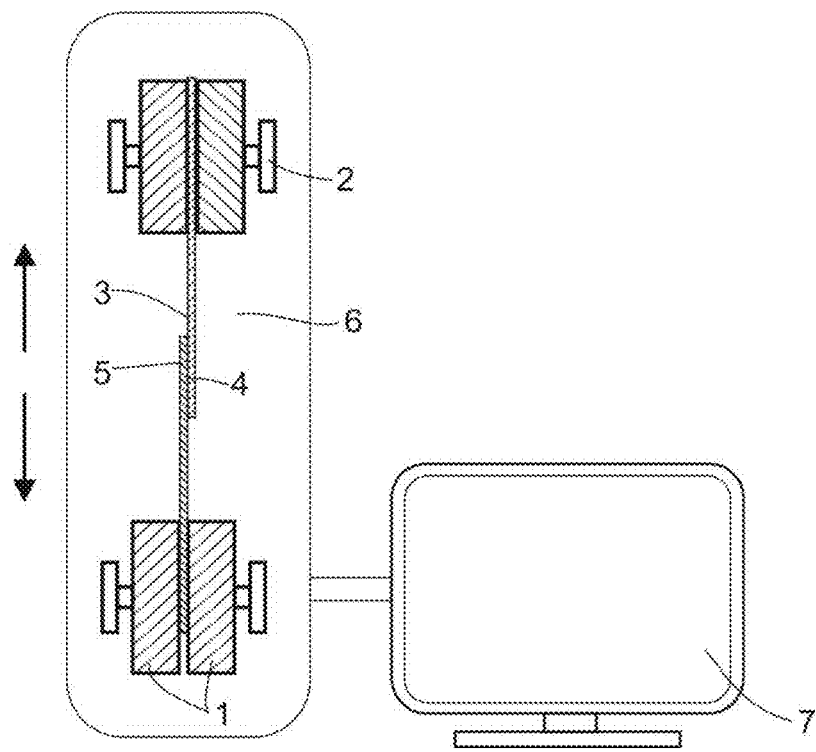
FIG. 1 is a first schematic diagram of a tester.

The present invention will be described in further details below in conjunction with embodiments.

It will be understood by those skilled in the art that the following embodiments are merely used for explaining the present invention and should not be construed as restraints in the scope of the present invention. If some specific technology or conditions are not specified in the embodiments, the embodiments shall be carried out according to the technology or conditions described in the literature in the art or according to the product specification. If the manufacturer of the materials or equipment used is not specified, the materials or equipment are all conventional products that can be purchased.

Unless specifically described in the following embodiments, the percentages are all weight percentages.

Embodiment 1

A determination method for the lip sticking force of the cigarette tipping paper includes the following steps:

step (1): preparing cigarette paper DCJ from China Tobacco Yunnan Industrial Co., Ltd, cutting the cigarette tipping paper accurately to 15 mm in width and 50 mm in length;

step (2), making artificial saliva according to Table 1.

TABLE 1

| Artificial saliva formulation | | | |
|---|---|---|---|
| Composition | Concentration (mg/mL) | Composition | Concentration (mg/mL) |
| NaCl | 1.4 | Glucose | 0.2 |
| KCl | 0.5 | Bovine submandibular gland salivary mucin | 2.7 |
| $CaCl_2$ | 0.1 | Amylase | 2.5* |
| $NaH_2PO_4$ | 0.15 | Acid phosphatase | 0.004* |
| $MgCl_2$ | 0.025 | Lysozyme | 0.7* |
| Urea | 0.09 | Adjust the pH to 7.0 before adding the protein | |

Note:
*indicates units/mL step (3) preparing polyvinyl chloride artificial leather as an artificial mouth skin with a thickness of 30 μm, and cutting the artificial mouth skin to 15 mm in width and 50 mm in length;

step (4), pipetting 10 μL artificial saliva accurately with a micro-syringe and evenly smearing on one side of the artificial mouth skin, a smearing area being 10*15=150 mm², bonding a printing surface of the cigarette tipping paper and the artificial mouth skin together through the artificial saliva and staying aside for 2 min; that is, the same areas are bonded;

step (5), selecting the M250-2.5 CT tensile tester of KARL company from Germany as test equipment, clamping the other side portions of the bonded tipping paper and the artificial mouth skin that are not bonded between the two jigs of the tensile tester, respectively, setting a distance between the two jigs to 50 mm and a movement rate to 50 mm/min; a maximum force collected at the moment when the tipping paper and artificial lips are separate being a maximum debonding force; and step (6), calculating the lip sticking force of DCJ cigarette tipping paper F=maximum debonding force (N)/sticking area (mm²)=0.932 N/150 mm²=6.2×10⁻³ N/mm².

Embodiment 2

A determination method for the lip sticking force of the cigarette tipping paper includes the following steps:

step (1): preparing cigarette paper DYT from China Tobacco Yunnan Industrial Co., Ltd, cutting the cigarette tipping paper accurately to 20 mm in width and 80 mm in length;

step (2), making artificial saliva according to Table 1.

step (3), preparing a medical silicone rubber soft skin as the artificial mouth skin with a thickness of 50 μm, and cutting the artificial mouth skin to 20 mm in width and 80 mm in length.

step (4), pipetting 15 μL artificial saliva accurately with a micro-syringe and evenly smearing on one side of the artificial mouth skin, a smearing area being 20*20=400 mm², bonding a printing surface of the cigarette tipping paper and the artificial mouth skin together through the artificial saliva and staying aside for 5 min; that is, the same areas are bonded;

step (5), selecting FP-2255 dynamic friction coefficient determinator as test equipment; clamping the other side portions of the bonded tipping paper and the artificial mouth skin that are not bonded between the two jigs of the tensile tester, respectively, setting a distance between the two jigs to 50 mm and a movement rate to 20 mm/min; a maximum force collected at the moment when the tipping paper and artificial lips are separate being a maximum debonding force; and step (6), calculating the lip sticking force of cigarette tipping paper DYT: F=maximum debonding force (N)/sticking area (mm²)=0.483 N/400 mm²=1.2×10⁻³ N/mm².

Embodiment 3

Figure 3:
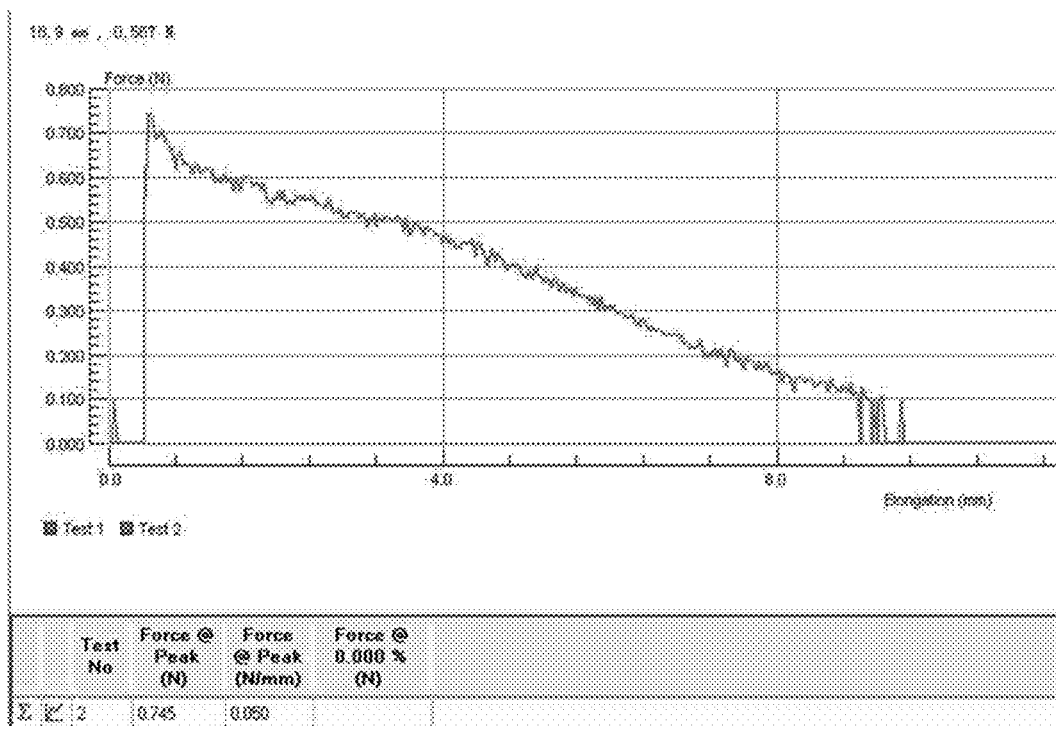
FIG. 3 is a test diagram of a debonding strength tester.

A determination method for the lip sticking force of the cigarette tipping paper includes the following steps:

step (1): preparing cigarette paper available on the market, cutting the cigarette tipping paper accurately to 10 mm in width and 100 mm in length;

step (2), making artificial saliva according to Table 1.

step (3) preparing polyurethane dry artificial leather as an artificial mouth skin with a thickness of 40 μm, and cutting the polyurethane dry artificial leather to 10 mm in width and 100 mm in length;

step (4), pipetting 20 μL artificial saliva accurately with a micro-syringe and evenly smearing on one side of the artificial mouth skin, a smearing area being 10*40=400 mm², bonding a printing surface of the cigarette tipping paper and the artificial mouth skin together through the artificial saliva and staying aside for 0.5 min; that is, the same areas are bonded;

step (5), selecting a debonding strength tester as test equipment; as shown in FIG. 1, clamping the other side portions of the bonded tipping paper and the artificial mouth skin that are not bonded between the two jigs of the tensile tester, respectively, setting a distance between the two jigs to 140 mm and a movement rate to 20 mm/min; The two jigs are installed on an intelligent board (existing equipment) containing a force sensor and a displacement sensor, and a force/displacement collector (usually a computer) is connected with the intelligent board containing the force sensor and the displacement sensor, which can collect the change data of the force and displacement in real time; and a maximum force collected at the moment when the tipping paper and artificial lips are separate being a maximum debonding force, test results shown in FIG. 3; and step (6), calculating the lip sticking force of cigarette tipping paper available on the market: F=maximum debonding force (N)/sticking area (mm²)=0.748 N/400 mm²=1.87×10⁻³ N/mm².

Embodiment 4

Figure 2:
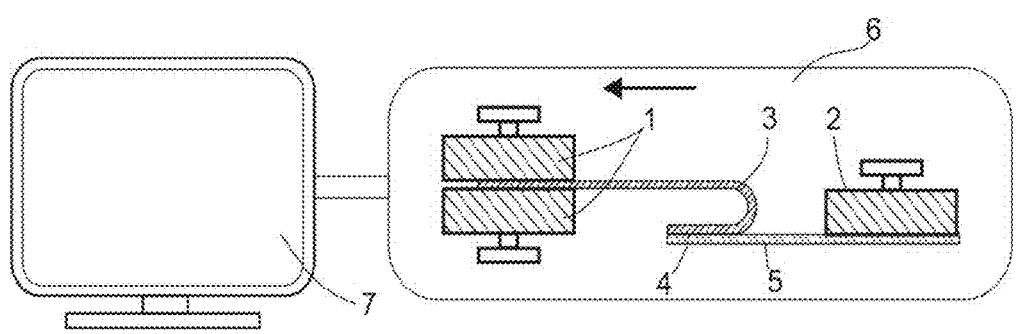
FIG. 2 is a second schematic diagram of the tester;
wherein 1 is a jig; 2 is a chuck; 3 is cigarette tipping paper; 4 is artificial saliva for smearing; 5 is artificial mouth skin; 6 is an intelligent board containing a force sensor and a displacement sensor; and 7 is a force and displacement collector.
Figure 4:
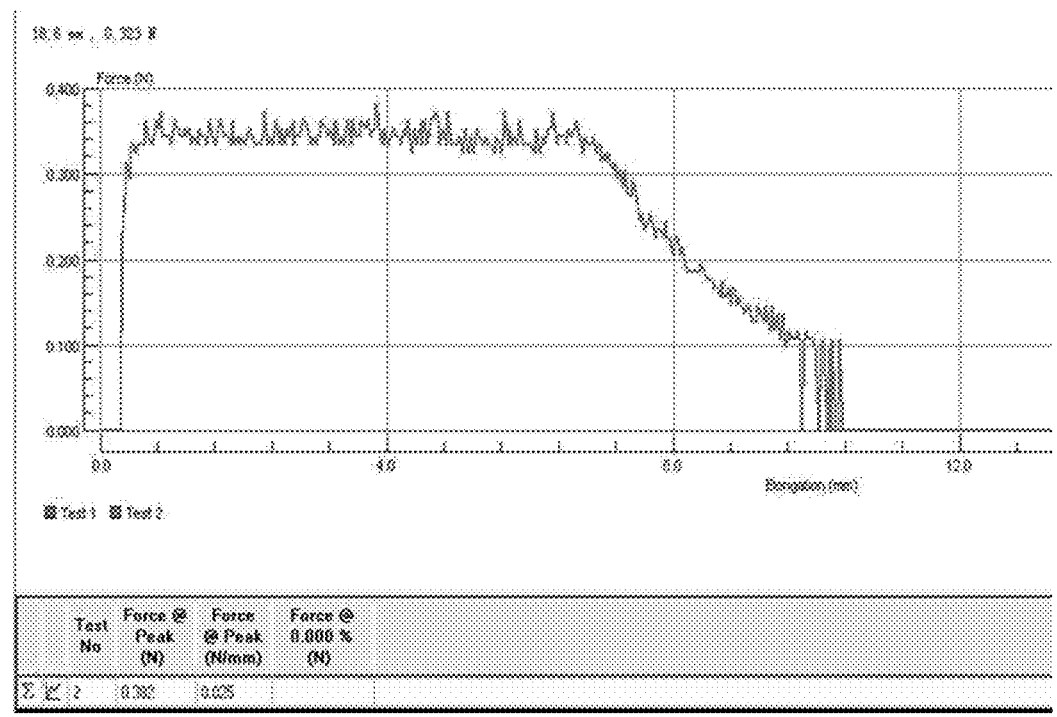
FIG. 4 is a test diagram of a dynamic friction coefficient determinator.

A determination method for the lip sticking force of the cigarette tipping paper includes the following steps:

step (1): preparing cigarette paper available on the market, cutting the cigarette tipping paper accurately to 50 mm in width and 200 mm in length;

step (2), making artificial saliva according to Table 1.

step (3) preparing active composite skin with an epidermal cell layer as an artificial mouth skin with a thickness of 40 μm, and cutting the active composite skin with the epidermal cell layer to 50 mm in width and 200 mm in length;

step (4), pipetting 30 μL artificial saliva accurately with a micro-syringe and evenly smearing on one side of the artificial mouth skin, a smearing area being 50*15=750 mm², bonding a printing surface of the cigarette tipping paper and the artificial mouth skin together through the artificial saliva and staying aside for 1 min; that is, the same areas are bonded;

step (5), selecting a dynamic friction coefficient determinator as test equipment; as shown in FIG. 2, clamping the other side portions of the bonded tipping paper and the artificial mouth skin that are not bonded between the two jigs of the dynamic friction coefficient determinator, respectively, setting a distance between the two jigs to 300 mm and a movement rate to 30 mm/min; the artificial mouth skin in FIG. 2 being fixed to a determination platform by the jigs; a maximum force collected at the moment when the tipping paper and artificial lips are separate being a maximum debonding force, test results shown in FIG. 4; and step (6), calculating the lip sticking force of cigarette tipping paper available on the market: F=maximum debonding force (N)/sticking area (mm²)=0.385 N/750 mm²=5.133×10⁻⁴ N/mm².

Embodiment 5

A determination method for the lip sticking force of the cigarette tipping paper includes the following steps:

step (1): preparing cigarette paper available on the market, cutting the cigarette tipping paper accurately to 50 mm in width and 200 mm in length;

step (2), making artificial saliva according to Table 1.

step (3) preparing active composite skin with an epidermal cell layer as an artificial mouth skin with a thickness of 40 μm, and cutting the active composite skin with the epidermal cell layer to 50 mm in width and 200 mm in length;

step (4), pipetting 30 μL artificial saliva accurately with a micro-syringe and evenly smearing on one side of the artificial mouth skin, a smearing area being 50*15=750 mm², bonding a printing surface of the cigarette tipping paper and the artificial mouth skin together through the artificial saliva and staying aside for 2 min; that is, the same areas are bonded;

step (5), selecting a debonding strength tester as test equipment; as shown in FIG. 1, clamping the other side portions of the bonded tipping paper and the artificial mouth skin that are not bonded between the two jigs of the tensile tester, respectively, setting a distance between the two jigs to 300 mm and a movement rate to 30 mm/min; The two jigs are installed on an intelligent board (existing equipment) containing a force sensor and a displacement sensor, and a force/displacement collector (usually a computer) is connected with the intelligent board containing the force sensor and the displacement sensor, which can collect the change data of the force and displacement in real time; and a maximum force collected at the moment when the tipping paper and artificial lips are separate being a maximum debonding force; and step (6), calculating the lip sticking force of cigarette tipping paper available on the market: F=maximum debonding force (N)/sticking area (mm²)=0.386 N/750 mm²=5.147×10⁻⁴ N/mm².

Embodiment 6

A determination method for the lip sticking force of the cigarette tipping paper includes the following steps:

step (1): preparing cigarette paper DYT from China Tobacco Yunnan Industrial Co., Ltd, cutting the cigarette tipping paper accurately to 1000 mm in width and 1000 mm in length;

step (2), making artificial saliva according to Table 1.

step (3), preparing a medical silicone rubber soft skin as the artificial mouth skin with a thickness of 50 μm, and cutting the artificial mouth skin to 1000 mm in width and 1000 mm in length;

step (4), pipetting 1000 μL artificial saliva accurately with a micro-syringe and evenly smearing on one side of the artificial mouth skin, a smearing area being 1000*100=100000 mm², bonding a printing surface of the cigarette tipping paper and the artificial mouth skin together through the artificial saliva and staying aside for 5 min; that is, the same areas are bonded;

step (5) selecting a tensile tester as test equipment; clamping the other side portions of the bonded tipping paper and the artificial mouth skin that are not bonded between the two jigs of the tensile tester, respectively, setting a distance between the two jigs to 500 mm and a movement rate to 500 mm/min; a maximum force collected at the moment when the tipping paper and artificial mouth skin are separate being a maximum debonding force; and step (6), calculating the lip sticking force of cigarette tipping paper DYT: F=maximum debonding force (N)/sticking area (mm²).

Embodiment 7

A determination method for the lip sticking force of the cigarette tipping paper includes the following steps:

step (1): preparing cigarette paper DYT from China Tobacco Yunnan Industrial Co., Ltd, cutting the cigarette tipping paper accurately to 1 mm in width and 5 mm in length;

step (2), making artificial saliva according to Table 1.

step (3), preparing a medical silicone rubber soft skin as the artificial mouth skin with a thickness of 50 μm, and cutting the artificial mouth skin to 1 mm in width and 5 mm in length.

step (4), pipetting 1 μL artificial saliva accurately with a micro-syringe and evenly smearing on one side of the artificial mouth skin, a smearing area being 1*2=2 mm², bonding a printing surface of the cigarette tipping paper and the artificial mouth skin together through the artificial saliva and staying aside for 5 s; that is, the same areas are bonded;

step (5), selecting a dynamic friction coefficient determinator as test equipment; clamping the other side portions of the bonded tipping paper and the artificial mouth skin that are not bonded between the two jigs of the tensile tester respectively, setting a distance between the two jigs to 5 mm and a movement rate to 1 mm/min; a maximum force collected at the moment when the tipping paper and artificial lips are separate being a maximum debonding force; and step (6), calculating the lip sticking force of cigarette tipping paper DYT: F=maximum debonding force (N)/sticking area (mm²).

The method of the present invention enables objective and accurate quantification of the lip sticking force of the tipping paper. The project team of the present invention tried to represent the lip sticking force by a printing color shedding method of the tipping paper in the preliminary test, i.e., using color differences to represent the lip sticking force by means of comparing the color shedding efficiency of the tipping paper before and after smoking, but the subsequent test shows that in the printing process even though there is a coating color shedding on the lips, it does not indicate that the tipping paper has a lip sticking force. That means there is no definite linear relationship between the color shedding rate and the lip sticking force. The method of the present invention was later obtained after several experimental studies and test. The present invention can effectively avoid the traditional unquantifiable concepts such as pasty lip sticking feeling and dry mouth feeling obtained by means of sensory evaluation, and avoid the disadvantages of strongly affected by subjective factors, great differences in product tasting results, harmful to human health and the like, and is easy to popularize and apply.

The basic principles, main features and advantages of the present invention are shown and described above. It will be understood by those skilled in the art that the present invention is not limited to the foregoing embodiments, the foregoing embodiments and description are merely illustrative of the principles of the present invention. Various changes and modifications may be made without departing from the spirit and scope of the present invention, all of which fall within the scope of the present invention as claimed. The protection scope of the present invention is defined by the appended claims and their equivalents.

What is claimed is:

1. A determination method for lip sticking force of cigarette tipping paper, comprising the following steps:
   1) cutting the cigarette tipping paper into a rectangle;
   2) making artificial saliva with a pH value of 5.5 to 7.5;
   3) cutting an artificial mouth skin into a rectangle with the same size as the cigarette tipping paper;
   4) sticking a first side of the artificial mouth skin cut in step 3) and a first side of the cigarette tipping paper cut in step 1) relatively through the artificial saliva, determining a sticking area, and after staying aside until a constant weight, obtaining a sample to be tested, wherein when sticking, a printing surface of the cigarette tipping paper faces the artificial mouth skin;
   5) clamping a second side of the cigarette tipping paper of the sample to be tested obtained in step 4) and a second side of the artificial mouth skin that are not bonded together on two jigs, respectively, setting a distance and a relative movement rate between the two jigs, and collecting a maximum debonding force at a moment the cigarette tipping paper separates from the artificial lip; and
   6) dividing the maximum debonding force obtained in step 5) by the sticking area of the cigarette tipping paper and the artificial mouth skin to obtain the lip sticking force of the cigarette tipping paper per unit area,
   wherein a material of the artificial mouth skin is medical silicone rubber soft skin, active composite skin with an epidermal cell layer, polyvinyl chloride artificial leather, polyurethane dry artificial leather, or polyolefin artificial leather.

2. The determination method for the lip sticking force of the cigarette tipping paper according to claim 1, wherein in step 1), the cigarette tipping paper has a width range of 1 mm to 1000 mm and a length range of 1 mm to 1000 mm.

3. The determination method for the lip sticking force of the cigarette tipping paper according to claim 1, wherein in step 2), the artificial saliva comprises sodium chloride, potassium chloride, calcium chloride, sodium dihydrogen phosphate, magnesium chloride, urea, glucose, mucin, amylase, acid phosphatase, and lysozyme.

4. The determination construction method for the lip sticking force of the cigarette tipping paper according to claim 3, wherein the artificial saliva comprises 1.40 mmol/L sodium chloride, 0.5 mmol/L potassium chloride, 0.1 mmol/L calcium chloride, 0.15 mmol/L sodium dihydrogen phosphate, 0.025 mmol/L magnesium chloride, 0.09 mmol/L urea, 0.2 mmol/L glucose, 2.7 mmol/L bovine submandibular gland salivary mucin, 2.5 units/mL amylase, 0.004 units/mL acid phosphatase, and 0.7 units/mL lysozyme.

5. The determination method for the lip sticking force of the cigarette tipping paper according to claim 1, wherein
   a volume range of the artificial saliva for sticking is 1 μL to 1000 μL;
   the artificial saliva is pipetted onto the artificial mouth skin using a micro-syringe, a pipette gun, or a pipette; and
   the printing surface of the cigarette tipping paper sticks to the artificial mouth skin.

6. The determination method for the lip sticking force of the cigarette tipping paper according to claim 1, wherein in step 4), a time of staying aside is 1 s to 300 s.

7. The determination method for the lip sticking force of the cigarette tipping paper according to claim 1, wherein in step 5), the two jigs completely clamp the second side of the cigarette tipping paper and the second side of the artificial mouth skin; and the two jigs move relative to each other.

8. The determination method for the lip sticking force of the cigarette tipping paper according to claim 1, wherein in step 5), the maximum debonding force is determined by using any one of a debonding strength tester, a tensile tester, and a dynamic friction coefficient determinator.

9. The determination method for the lip sticking force of the cigarette tipping paper according to claim 8, wherein the tensile tester has a load range of 0 N to 200 N and a resolution of greater than or equal to 0.01 N.

10. The determination method for the lip sticking force of the cigarette tipping paper according to claim 1, wherein in step 5), the distance between the two jigs is 5 mm to 500 mm, and the relative movement rate is 1 mm/min to 500 mm/min.

* * * * *